US009379954B2

(12) United States Patent
DeLeo et al.

(10) Patent No.: US 9,379,954 B2
(45) Date of Patent: Jun. 28, 2016

(54) CONFIGURATION MANAGEMENT FOR A RESOURCE WITH PREREQUISITES

(71) Applicant: Chef Software Inc., Seattle, WA (US)

(72) Inventors: Daniel Stephen DeLeo, Seattle, WA (US); Adam Brent Jacob, San Francisco, CA (US); Christopher James Brown, Issaquah, WA (US); Marc Alan Paradise, Bear, DE (US)

(73) Assignee: Chef Software Inc., Seattle, WA (US)

( * ) Notice: Subject to any disclaimer, the term of this patent is extended or adjusted under 35 U.S.C. 154(b) by 0 days.

(21) Appl. No.: 13/831,932

(22) Filed: Mar. 15, 2013

(65) Prior Publication Data

US 2014/0280958 A1    Sep. 18, 2014

(51) Int. Cl.
*G06F 15/173* (2006.01)
*H04L 12/26* (2006.01)
*H04L 12/24* (2006.01)

(52) U.S. Cl.
CPC ........ *H04L 43/0817* (2013.01); *H04L 41/0813* (2013.01)

(58) Field of Classification Search
CPC .............. H04L 41/0813; H04L 5/0035; H04L 29/08153
USPC ................................. 709/226, 220, 203, 217
See application file for complete search history.

(56) References Cited

U.S. PATENT DOCUMENTS

| | | | |
|---|---|---|---|
| 5,721,824 A * | 2/1998 | Taylor | ........................... 709/203 |
| 7,284,244 B1 | 10/2007 | Sankaranarayan et al. | |
| 7,966,346 B1 * | 6/2011 | Jameson | ....................... 707/796 |
| 2001/0029605 A1 * | 10/2001 | Forbes et al. | .................... 717/11 |
| 2005/0010608 A1 | 1/2005 | Horikawa | |
| 2007/0143765 A1 | 6/2007 | Aridor et al. | |
| 2009/0119390 A1 | 5/2009 | Donatelli et al. | |
| 2009/0187619 A1 | 7/2009 | Shigeta et al. | |

(Continued)

FOREIGN PATENT DOCUMENTS

| | | |
|---|---|---|
| JP | 2001-043199 A | 2/2001 |
| JP | 2012-137931 A | 7/2012 |

OTHER PUBLICATIONS

State Machine, Sep. 21, 2005, WhatIs.com, retrieved from http://whatis.techtarget.com/definition/state-machine?vgnextfmt=print on Jul. 6, 2015.*
NOP, <http://en.wikipedia.org/wiki/NOP>, modified Apr. 3, 2013, accessed Apr. 3, 2013.

(Continued)

*Primary Examiner* — El Hadji Sall
(74) *Attorney, Agent, or Firm* — John W. Branch; Lowe Graham Jones PLLC

(57) ABSTRACT

Embodiments are directed towards employing a configuration management system to report one or more assumptions based on whether or not prerequisites for a resource are satisfied. The configuration management system may determine at least one prerequisite that corresponds to a provided resource. The prerequisites may indicate what the resource requires in order to put the system into the target state. If the prerequisites are unsatisfied, then assumptions regarding the system may be determined and reported to a user of the system. The assumptions may include at least a state transition that upon occurrence puts the system into the target state. If the system is in a non-operational mode, such that state actions and state transitions are simulated, rather than being executed, the system may be enabled to perform other actions as if the prerequisites were satisfied and the state transition occurred, even if it is not.

30 Claims, 9 Drawing Sheets

(56) References Cited

U.S. PATENT DOCUMENTS

| | | |
|---|---|---|
| 2009/0254913 A1 | 10/2009 | Kawano et al. |
| 2010/0082141 A1 | 4/2010 | Solimano et al. |
| 2011/0321056 A1 | 12/2011 | Branson et al. |
| 2012/0151468 A1* | 6/2012 | Wookey .................. 717/175 |

OTHER PUBLICATIONS

International Search Report and Written Opinion for Application No. PCT/US2014/019603 mailed on Jul. 29, 2014, 9 pages.

International Search Report and Written Opinion for Application No. PCT/US2014/019580 mailed on Jun. 27, 2014, 11 pages.

* cited by examiner

```
package[apache2]
  target state is installed, current state is not installed
  would execute install action
service[apache2]
  WARNING: expected init script in /etc/init.d/apache2 does not exist
  WARNING: assuming init script would have been previously installed
  WARNING: assuming current state of service is down
  target state is running, current state is down
  would execute start action
template[/etc/apache2/fake_config.conf]
  WARNING: enclosing directory /etc/apache2 does not exist
  WARNING: assuming directory /etc/apache2 would have been previously created
  target state is content-sha(830ab1...), current state is nonexistent
  would execute create action
  would notify service[apache2] with restart action
service[apache2] (notified)
  WARNING: expected init script in /etc/init.d/apache2 does not exist
  WARNING: assuming init script would have been previously installed
  WARNING: assuming current state of service is down
  target state is restarted, current state is down
  would execute restart action
```
⎫ 702

```
package 'apache2' do
  action :install
end
```
⎫ 704

```
service 'apache2' do
  action :start
end
```
⎫ 708

```
template '/etc/apache2/fake_config.conf' do
  owner "root"
  group "root"
  mode "8654"
  action :create
  notifies :restart, "service[apache2]"
end
```
⎫ 706

*802* template[/etc/sudoers]
target state is content-sha(f0d965...) current state is content-sha(ede78b)
content changes:
--- /etc/sudoers    2011-11-03 12:51:53.000000000 -0700
+++ /tmp/tempfile-sudoers    2012-03-15 16:09:30.000000000 -0700
@@ -32,7 +32,7 @@

User privilege specification
root       ALL=(ALL) ALL
-%admin    ALL=(ALL) ALL
+%admin    ALL=(ALL) NOPASSWD: ALL

Uncomment to allow people in group wheel to run all commands
wheel     ALL=(ALL) ALL
would execute create action

*804* template '/etc/sudoers' do
  owner "root"
  group "root"
  mode "0448"
  action :create
end

FIG. 8

CONFIGURATION MANAGEMENT FOR A RESOURCE WITH PREREQUISITES

TECHNICAL FIELD

The present invention relates generally to configuration management, and more particularly, but not exclusively, to reporting one or more assumptions based on whether or not prerequisites for a resource are satisfied.

BACKGROUND

The increased deployment and popularity of cloud-based applications and services running on computing clusters of physical and virtual machines has significantly complicated configuration management tasks, such as provisioning software, deploying software patches, upgrading servers, or the like. Currently, system administrators may employ a variety of ad hoc procedures to perform configuration management, but for large machine clusters these ad hoc procedures may be inadequate. The inadequacies of ad hoc configuration management procedures may jeopardize the operations of critical cloud-based services. For example, if installing a piece of software depends on the previous installation of another piece of software, the system may error out if the previous software was not completely installed. This error may result in extended/unknown downtime for critical systems while a system administrator attempts to determine the cause of the error. It is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIGS. 7 and 8 show use case illustrations of multiple resources and the reported assumptions generated based on the resources.

DETAILED DESCRIPTION

Figure 1:
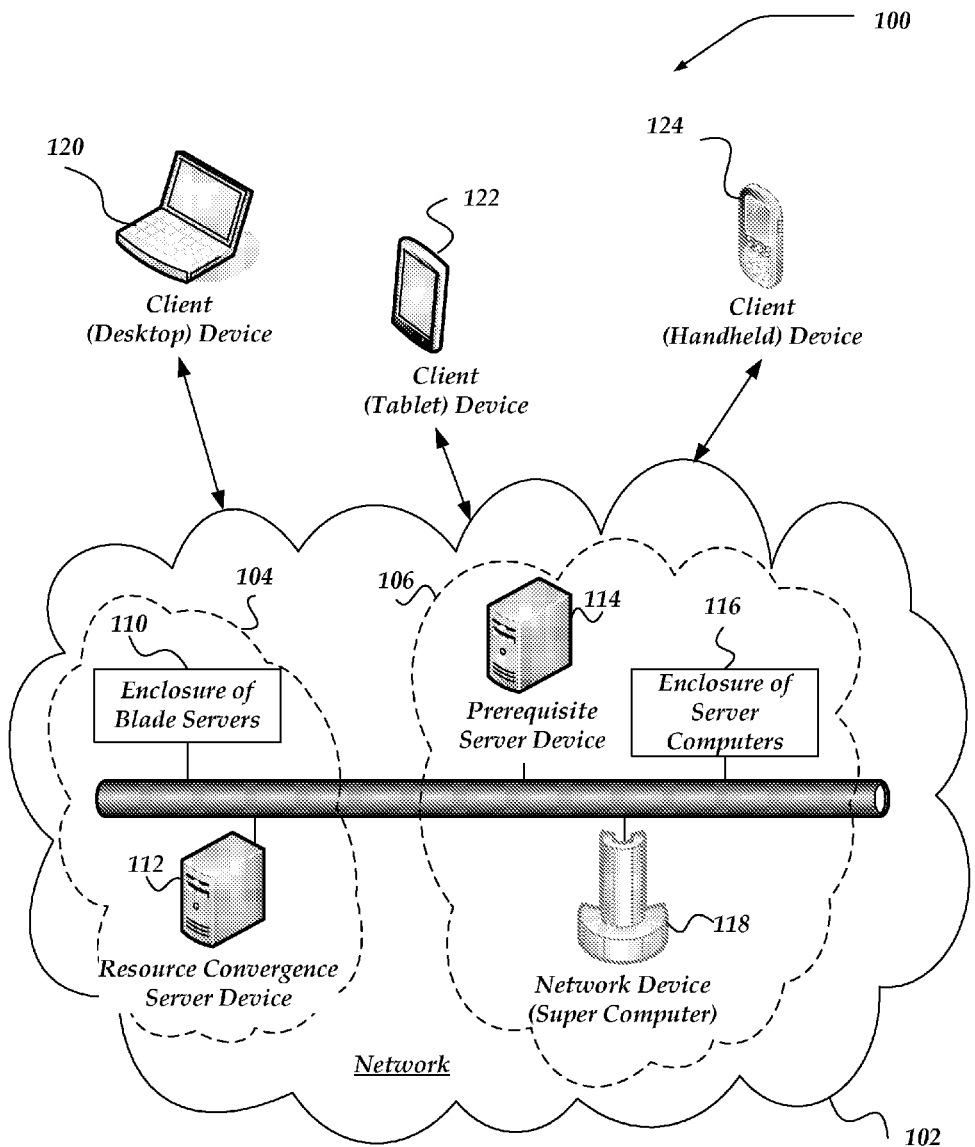
FIG. 1 illustrates a system environment in which various embodiments may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "resource" may refer to a data object that defines a target state of some aspect of a system of at least one network device, which may be referred to herein as a system and/or computing system. Examples of such aspects may include, but is not limited to a file's content, security metadata, process installation success, or the like.

As used herein, the phrase "resource convergence" may refer to a process of determining what aspects of a resource do not match a target state and executing one or more state transitions to bring the resource into the target state. In some embodiments, a state transition may not occur if the system is in the target state, or the state defined by the resource, and the resource may be referred to as being converged.

As used herein, the term "notification" may refer to a link between two or more resources where convergence in one resource may trigger convergence of a linked resource. If the notifying resource is already converged, convergence may not be triggered in the linked resource.

As used herein, the phrase "configuration management system" may refer to a software program that converges a collection of resources. In some embodiments, a collection of resources may include a plurality of resources, but in other embodiments, it may include a single resource.

As used herein, the phrase "system convergence" may refer to a process of converging all resources in the configuration management system's collection of resources.

As used herein, the term "prerequisite" may refer to instructions, conditions, or the like, that define what the resource depends on, or otherwise requires, in order to put the system into the target state as defined by the resource.

As used herein, the term "assumptions" may refer to instructions and/or information regarding what prerequisites were or were not satisfied for a resource and/or why a prerequisite was not satisfied. In some embodiments, assumptions may include state transitions that upon occurrence put the system into a target state.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to employing a configuration management system to report one or more assumptions based on whether or not prerequisites for a resource are satisfied. In some embodiments, the configuration management system may determine at least one prerequisite that corresponds to a provided resource. In some embodiments, the prerequisites may be instructions, conditions, or the like, that define what the resource depends on, or otherwise requires, in order to put the system into the target state as defined by the resource. In some embodiments, the prerequisites may be based on at least one previously determined assumption for another resource. If the prerequisites are unsatisfied, then at least one assumption regarding the system may be determined and reported to a user of the system. The at least one assumption may include at least a state transition that upon occurrence puts the system into the target state.

In some embodiments, the computing system may be in a non-operational mode, such that state actions and state transitions are simulated, rather than occurring and/or being executed. In at least one such embodiment, the system may be enabled to perform other actions as if the prerequisites were satisfied and the state transition occurred, even if it is not.

In at least one of various embodiments, a plurality of resources may be provided. In some embodiments, at least one resource may be dependent on another resource, such that at least one prerequisite for a resource is based on at least one previously determined assumption for another resource.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include Resource Convergence Server Device (RCSD) 112, Prerequisite Server Device (PSD) 114, enclosure of blade servers 110, enclosure of server computers 116, super computer network device 118, and the like. Although not shown, one or more client devices may be included in cloud network 102 in one or more arrangements to provide one or more network services to a user. Also, these arrangements of networked computing devices may or may not be mutually exclusive of each other.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, desktop client device 120, and the like. Although not shown, in various embodiments, the user may also employ notebook computers, desktop computers, microprocessor-based or programmable consumer electronics, network appliances, mobile telephones, smart telephones, wearable client devices, pagers, radio frequency (RF) devices, infrared (IR) devices, Personal Digital Assistants (PDAs), televisions, integrated devices combining at least one of the preceding devices, and the like.

One embodiment of a client device is described in more detail below in conjunction with FIG. 3. Generally, client devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G) generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, SMS, HSDPA, and the like.

One embodiment of RCSD 112 is described in more detail below in conjunction with FIG. 4. Briefly, however, RCSD 112 includes virtually any network device capable of performing configuration management tasks, including resource convergence. In at least one of various embodiments, RCSD 112 may determine if prerequisites for a resource are satisfied. And if so, determine and report at least one assumption regarding the unsatisfied prerequisites. Devices that may be arranged to operate as RCSD 112 include various network devices, including, but not limited to personal computers, desktop computers, multiprocessor systems, microprocessor-based or programmable consumer electronics, network PCs, server devices, network appliances, and the like.

Although FIG. 1 illustrates RCSD 112 as a single computing device, the invention is not so limited. For example, one or more functions of the RCSD 112 may be distributed across one or more distinct network devices. Moreover, RCSD 112 is not limited to a particular configuration. Thus, in one embodiment, RCSD 112 may contain a plurality of network devices. In another embodiment, RCSD 112 may contain a plurality of network devices that operate using a master/slave approach, where one of the plurality of network devices of RCSD 112 operates to manage and/or otherwise coordinate operations of the other network devices. In other embodiments, the RCSD 112 may operate as a plurality of network devices within a cluster architecture, a peer-to-peer architecture, and/or even within a cloud architecture. Thus, the invention is not to be construed as being limited to a single environment, and other configurations, and architectures are also envisaged.

One embodiment of PSD 114 is described in more detail below in conjunction with FIG. 4. Briefly, however, PSD 114 includes virtually any network device capable of maintaining prerequisites for a plurality of resources. In some embodiments, one or more prerequisites may correspond to each resource. Devices that may be arranged to operate as PSD 114 include various network devices, including, but not limited to personal computers, desktop computers, multiprocessor systems, microprocessor-based or programmable consumer electronics, network PCs, server devices, network appliances, and the like. Although illustrated separate, functions of PSD 114 and RCSD 112 may be employed together and/or separate as hardware, software, or a combination thereof.

Although FIG. 1 illustrates PSD 114 as a single computing device, the invention is not so limited. For example, one or more functions of the PSD 114 may be distributed across one or more distinct network devices. Moreover, PSD 114 is not limited to a particular configuration. Thus, in one embodiment, PSD 114 may contain a plurality of network devices. In another embodiment, PSD 114 may contain a plurality of network devices that operate using a master/slave approach, where one of the plurality of network devices of PSD 114 operates to manage and/or otherwise coordinate operations of the other network devices. In other embodiments, the PSD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Enclosure of Blade Servers

Figure 2A:
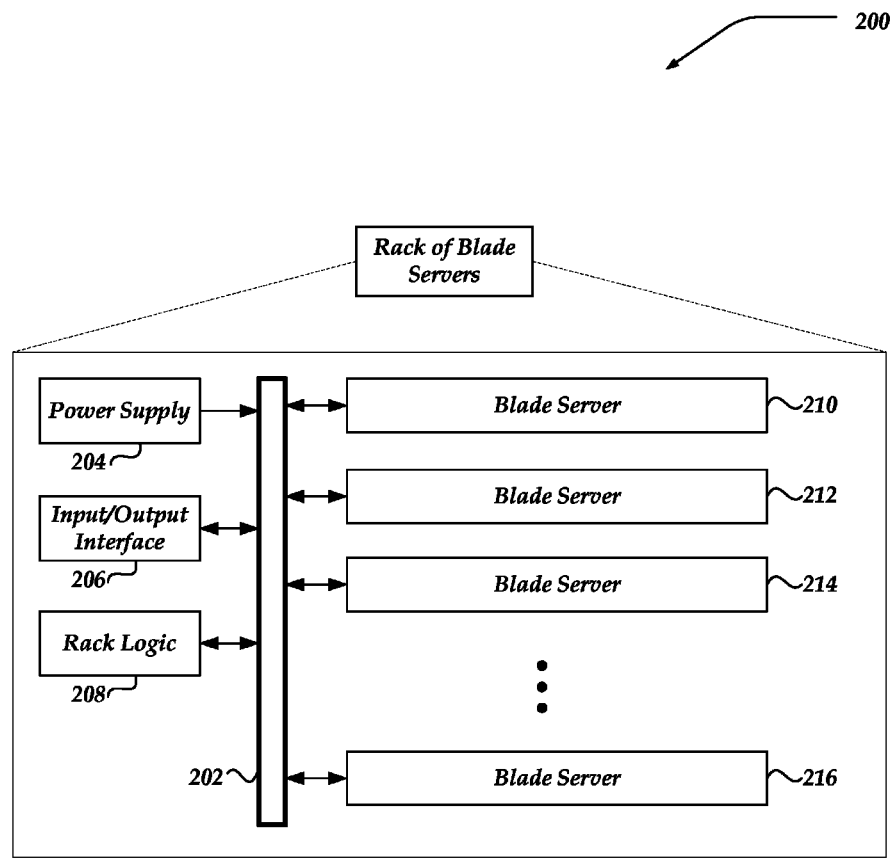
FIG. 2A shows a rack of blade servers that may be included in various embodiments.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
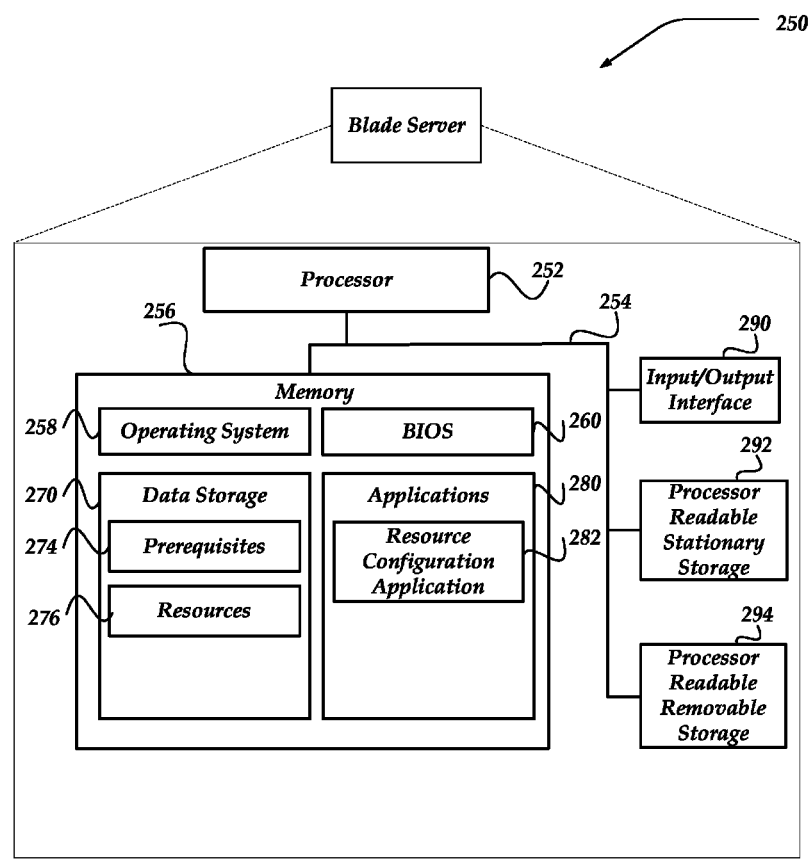
FIG. 2B illustrates an embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 may include processor 252 which communicates with memory 256 via bus 254. Blade server 250 may also include input/output interface 290, processor-readable stationary storage device 292, and processor-readable removable storage device 294. Input/output interface 290 can enable blade server 250 to communicate with other blade servers, client devices, network devices, and the like. Interface 290 may provide wireless and/or wired communication links for blade server. Processor-readable stationary storage device 292 may include devices such as an electromagnetic storage device (hard disk), solid state hard disk (SSD), hybrid of both an SSD and a hard disk, and the like. Also, processor-readable removable storage device 294 enables processor 252 to read non-transitive storage media for storing and accessing processor-readable instructions, modules, data structures, and other forms of data. The non-transitive storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, or LINUX™, or a specialized server operating system such as Microsoft's Windows Server™ and Apple Computer's iOS Server™.

Memory 256 may further include one or more data storage 270, which can be utilized by blade server 250 to store, among other things, applications 280 and/or other data. Data stores 270 may include program code, data, algorithms, and the like, for use by processor 252 to execute and perform actions. In one embodiment, at least some of data store 270 might also be stored on another component of blade server 250, including, but not limited to, processor-readable removable storage device 294, processor-readable stationary storage device 292, or any other processor-readable storage device (not shown). Data storage 270 may include, for example, prerequisites 274 and resources 276. In at least one embodiment, prerequisites 274 may include or more prerequisites for each resource 276. In some embodiments, prerequisites 274 may include anonymous functions, which may be associated with resources 276 and/or resource configuration application 282.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, resource configuration application 282. In some embodiments, resource configuration application 282 may be configured to perform configuration management tasks, including resource convergence. In at least one of various embodiments, resource configuration application 282 may determine if prerequisites for a resource are satisfied. And if so, determine and report at least one assumption regarding the unsatisfied prerequisites. In any event, resource configuration application 828 may employ processes, or parts of processes, similar to those described in conjunction with FIGS. 5-6, to perform at least some of its actions.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Illustrative Client Device

Figure 3:
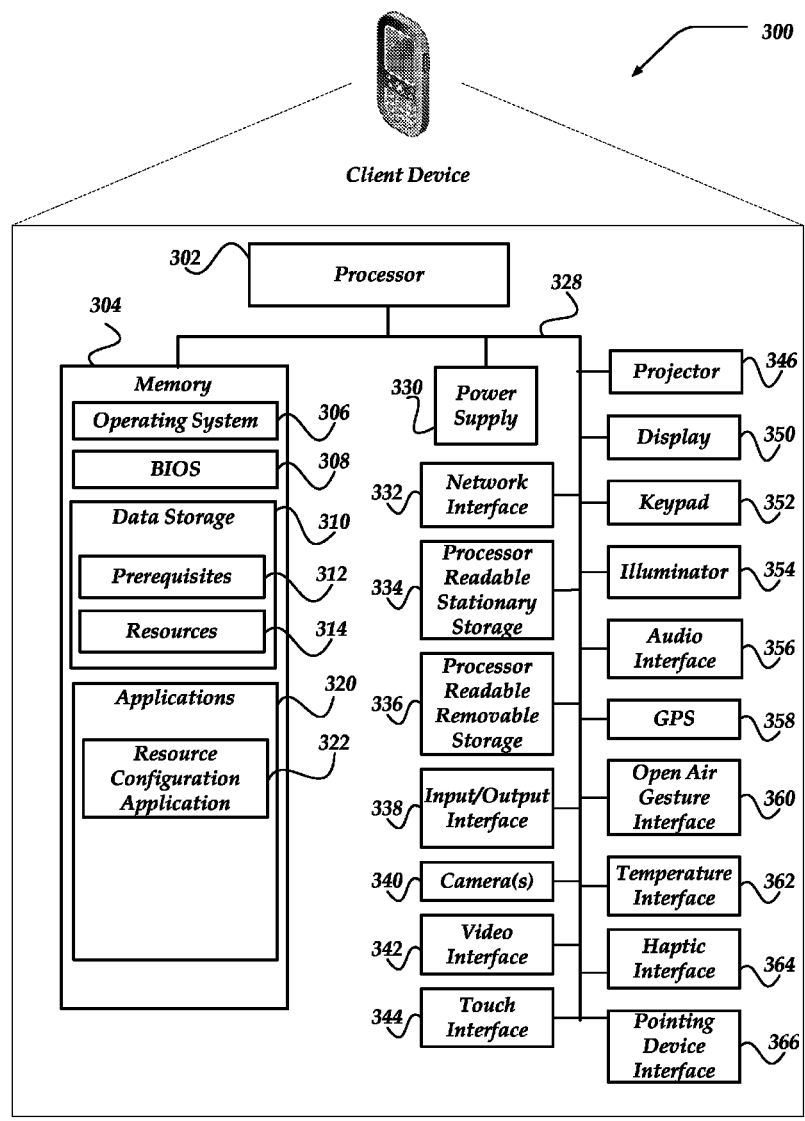
FIG. 3 shows a client device that may be included in various embodiments.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of client device 300, including, but not limited to, non-transitory processor-readable removable storage device 336, processor-readable stationary storage device 334, or even external to the client device. In some embodiments, data storage 310 may include prerequisites 312 and/or resources 314. In at least one of various embodiments, prerequisites 312 and/or resources 314 may be embodiments of prerequisites 274 and/or resources 276 of FIG. 2B, respectively.

Applications 320 may include computer executable instructions which, when executed by client device 300, transmit, receive, and/or otherwise process instructions and data. Applications 320 may include, for example, resource configuration application 322. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Resource configuration application 322 may be configured to perform configuration management tasks, including resource convergence. In at least one of various embodiments, resource configuration application 322 may determine if prerequisites for a resource are satisfied. And if so, determine and report at least one assumption regarding the unsatisfied prerequisites. In any event, resource configuration application 322 may employ processes, or parts of processes, similar to those described in conjunction with FIGS. 5-6, to perform at least some of its actions.

Illustrative Network Device

Figure 4:
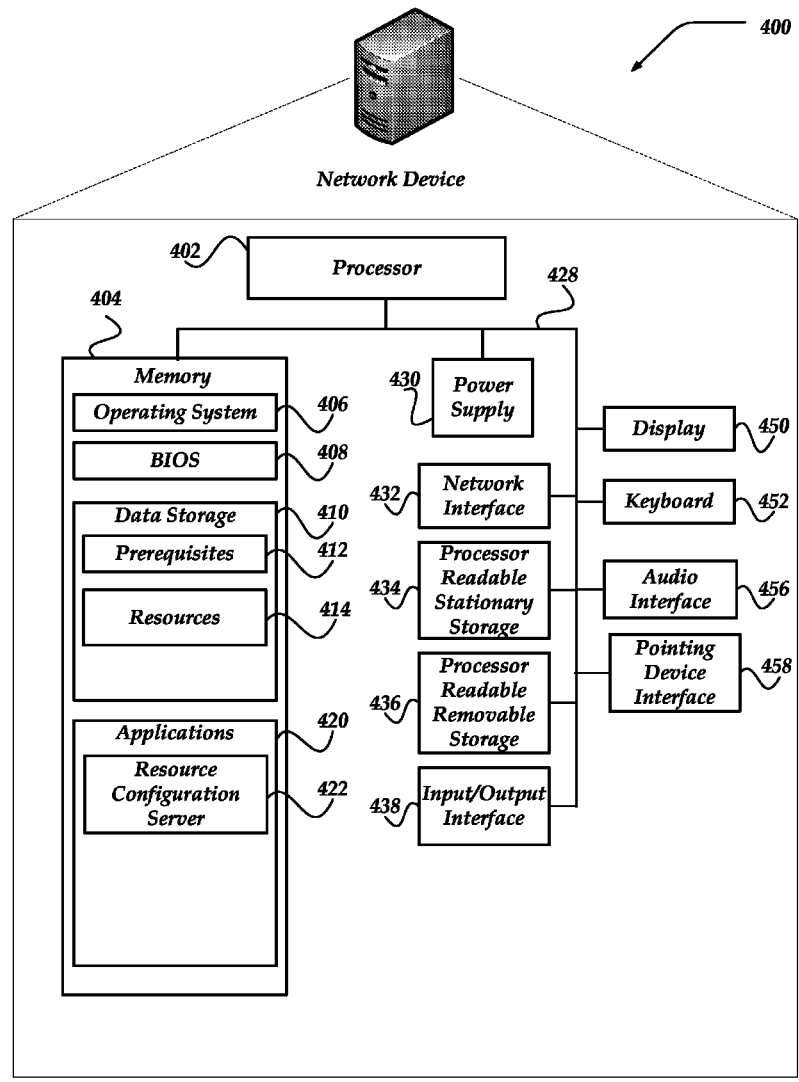
FIG. 4 illustrates a network device that may be included in various embodiments.

FIG. 4 shows one embodiment of network device 400 that may be included in a system implementing the invention. Network device 400 may include many more or less components than those shown in FIG. 4. However, the components shown are sufficient to disclose an illustrative embodiment for practicing the present invention. Network device 400 may represent, for example, one embodiment of at least one of network device 112, 114, or 120 of FIG. 1.

As shown in the figure, network device 400 may include a processor 402 in communication with a memory 404 via a bus 428. Network device 400 may also include a power supply 430, network interface 432, audio interface 456, display 450, keyboard 452, input/output interface 438, processor-readable stationary storage device 434, processor-readable removable storage device 436, and pointing device interface 458. Power supply 430 provides power to network device 400.

Network interface 432 may include circuitry for coupling network device 400 to one or more networks, and is constructed for use with one or more communication protocols and technologies including, but not limited to, protocols and technologies that implement any portion of the Open Systems Interconnection model (OSI model), GSM, CDMA, time division multiple access (TDMA), UDP, TCP/IP, SMS, MMS, GPRS, WAP, UWB, WiMax, SIP/RTP, or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 also may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components can include any component that allows the computer to take input from, or send output to, a human user of a computer.

Memory 404 may include RAM, ROM, and/or other types of memory. Memory 404 illustrates an example of computer-readable storage media (devices) for storage of information such as computer-readable instructions, data structures, program modules or other data. Memory 404 may store BIOS 408 for controlling low-level operation of network device 400. The memory may also store operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's iOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data stores 410 may further include program code, data, algorithms, and the like, for use by a processor, such as processor 402 to execute and perform actions. In one embodiment, at least some of data store 410 might also be stored on another component of network device 400, including, but not limited to, non-transitory media inside processor-readable removable storage device 436, processor-readable stationary storage device 434, or any other computer-readable storage device within network device 400, or even external to network device 400.

In some embodiments, data storage 410 may include prerequisites 412 and/or resources 414. In at least one of various embodiments, prerequisites 412 and/or resources 414 may be embodiments of prerequisites 274 and/or resources 276 of FIG. 2B, respectively. In at least one embodiment, prerequisites 412 may be stored and/or otherwise processed by PSD 114 of FIG. 1. In at least another embodiment, resources 414 may be stored and/or otherwise processed by RCSD 112 of FIG. 1.

Applications 420 may include computer executable instructions which, when executed by network device 400, transmit, receive, and/or otherwise process messages (e.g., SMS, MMS, Instant Message (IM), email, and/or other messages), audio, video, and enable telecommunication with another user of another client device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include, for example, resource configuration application 422.

Resource configuration application 422 may be configured to perform configuration management tasks, including resource convergence. In at least one of various embodiments, resource configuration application 422 may determine if prerequisites for a resource are satisfied. And if so, determine and report at least one assumption regarding the unsatisfied prerequisites. In some embodiments, resource configuration application 422 may be employed by RCSD 112 of FIG. 1. In any event, resource configuration application 422 may employ processes, or parts of processes, similar to those described in conjunction with FIGS. 5-6, to perform at least some of its actions.

General Operation

The operation of certain aspects of the invention will now be described with respect to FIGS. 5 and 6. In at least one of various embodiments, processes 500 and 600 described in conjunction with FIGS. 5 and 6, respectively, may be implemented by and/or executed on a single network device, such as network device 400 of FIG. 4. In other embodiments, these processes or portions of process thereof may be implemented by and/or executed on a plurality of network devices, such as network device 400 of FIG. 4. In yet other embodiments, these processes, or portions thereof, may be implemented by and/or executed on one or more blade servers, such as blade server 250 of FIG. 2B. However, embodiments are not so limited and various combinations of network devices, blade servers, or the like may be utilized.

Figure 5:
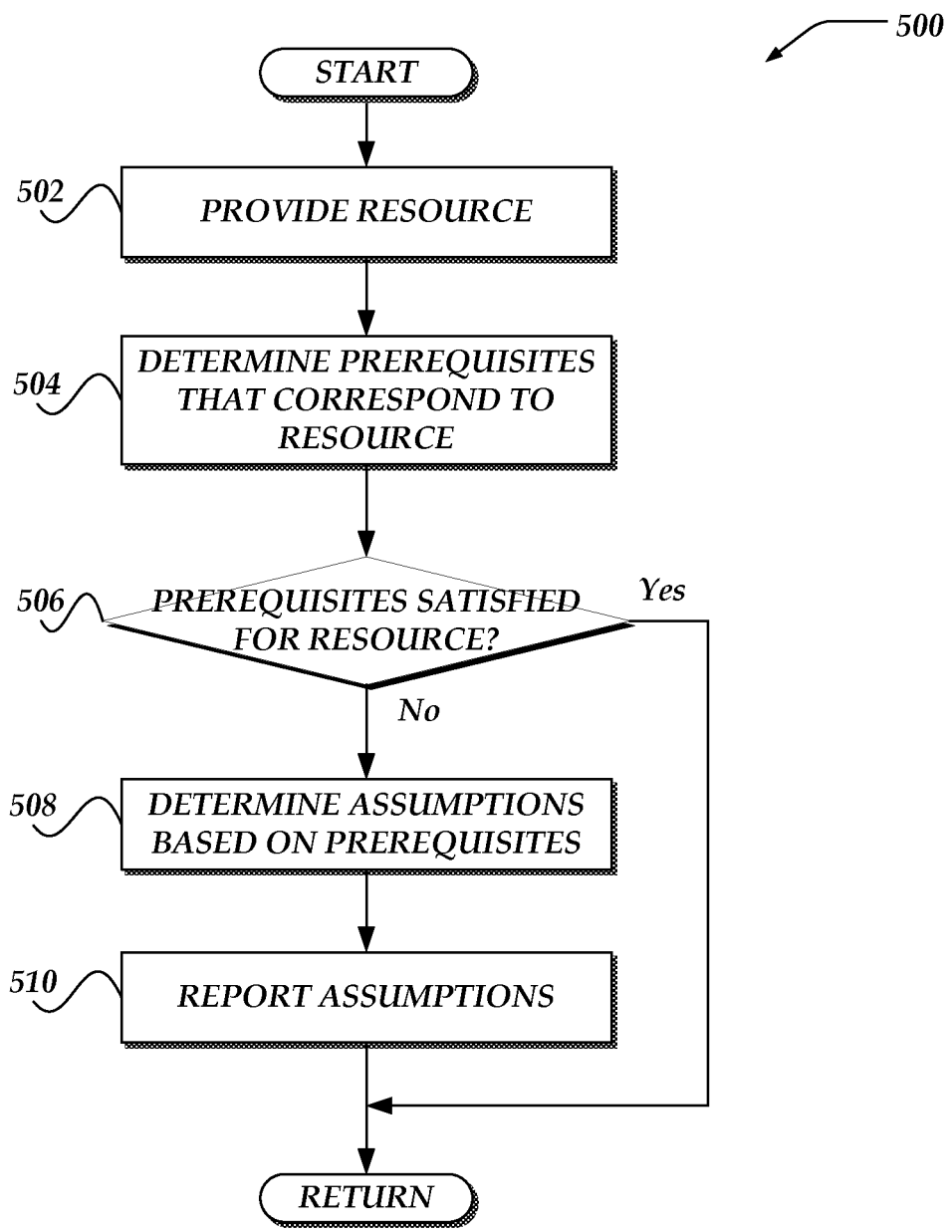
FIG. 5 illustrates a logical flow diagram generally showing one embodiment of an overview process for determining if prerequisites for a resource are satisfied and reporting assumptions based on the prerequisites.

FIG. 5 illustrates a logical flow diagram generally showing one embodiment of an overview process for determining if prerequisites for a resource are satisfied and reporting assumptions based on the prerequisites. Process 500 begins, after a start block, at block 502, where a resource may be provided. In at least one embodiment, the resource may be a data object that defines a target state of the computing system. In some embodiments, a user may determine and/or select the resource. In at least one embodiment, each resource may include one or more attributes that may define the target state.

In at least one of various embodiments, one or more providers may be employed to perform an action based on the provided resource to put the system into the target state as defined by the resource. In some embodiments, a provider may be a state machine and/or a class of objects that moves and/or includes instructions for moving resources from a current state to a target state.

In some embodiments, the provider may employ a pre-defined or user-selected action for moving a resource (i.e., the computing system) between states. In some embodiments, each provider may be configured to perform separate actions for a given resource for different computing systems and/or platforms. For example, assume a resource defines a target state of an application being installed. In this example, different providers may be employed for different operating systems, where each provider includes the actions that enable installation of the application for a given operating system.

In at least one embodiment, a provider may utilize the attributes of a resource to generate one or more requirement functions, such as one or more prerequisites. In some embodiments, each requirement function may correspond to an assumption that can be reported to a user. In some embodiments, a provider can instantiate a lower-level provider and pass its requirements to the lower-level provider.

In any event, process 500 proceeds to block 504, where at least one prerequisite that corresponds to the provided resource may be determined. In some embodiments, the prerequisites may be instructions, conditions, or the like, that define what the resource depends on in order to put the computing system into the target state as defined by the resource.

In at least one embodiment, the prerequisites may be anonymous functions (e.g., requirement functions generated by a provider based on attributes of the provided resource) that may be packaged into the resource (i.e., the data object). In other embodiments, the prerequisites may be encoded into the source code of the data object, the provider, or the like. In at least one embodiment, the prerequisites may indicate what previous actions should occur and/or what previous conditions should be satisfied before a state transition occurs to put the system into the target state. For example, the prerequisites may include the previous installation of program, previously starting/running a program, previously creating and/or initializing a file/directory, or the like. In some embodiments, the prerequisites may identify what a current state of the system should be to enable a state transition to put the system into the target state defied by the resource.

Process 500 continues at decision block 506, where a determination may be made whether the at least one prerequisite is satisfied for the resource. In some embodiments, this determination may be performed by comparing at least a portion of the current state of the system and the prerequisites.

In some embodiments, one or more prerequisites may be satisfied, while one or more other prerequisites may be unsatisfied. In at least one embodiment, the determination whether the at least one prerequisite is satisfied may depend on each prerequisite for the resource being satisfied. For example, assume two prerequisites for a resource include "a program is installed" and "a directory is created." In this example, the prerequisites for the resource, as a whole, may be unsatisfied if the program is installed, but the directory is not created—or if the directory is created, but the program is not installed. However, embodiments are not so limited and other methods of determining if prerequisites are satisfied may be employed. If the prerequisites are satisfied, then process 500 may return to a calling process to perform other actions; otherwise, process 500 may flow to block 508.

At block 508, at least one assumption may be determined based on the prerequisites that correspond to the resource and whether the prerequisites are satisfied. In at least one embodiment, the prerequisites for the resource may include a link, reference, or other association with one or more assumptions. In some embodiments, the assumptions may include instructions and/or information regarding what prerequisites were or were not satisfied and/or why a prerequisite was not satisfied. In other embodiments, the assumptions may indicate what the target state of the system would be if the prerequisites were satisfied. For example, if a prerequisite of "a program is installed" is unsatisfied—the determined assumption may indicate that the program was not installed, but it will be assumed that the program was installed to enable the system perform other actions (e.g., to move to the target state with a state transition).

Process 500 next proceeds to block 510, where the determined assumptions may be reported. In at least one embodiment, the report may be displayed and/or otherwise provided to a user of the computing system (e.g., a system administrator). In some embodiments, the system may be enabled to perform other actions as if the prerequisites were satisfied and a state transition occurred to put the system into the target state—as defined by the resource.

After block 510, process 500 may return to a calling process to perform other actions.

Figure 6:
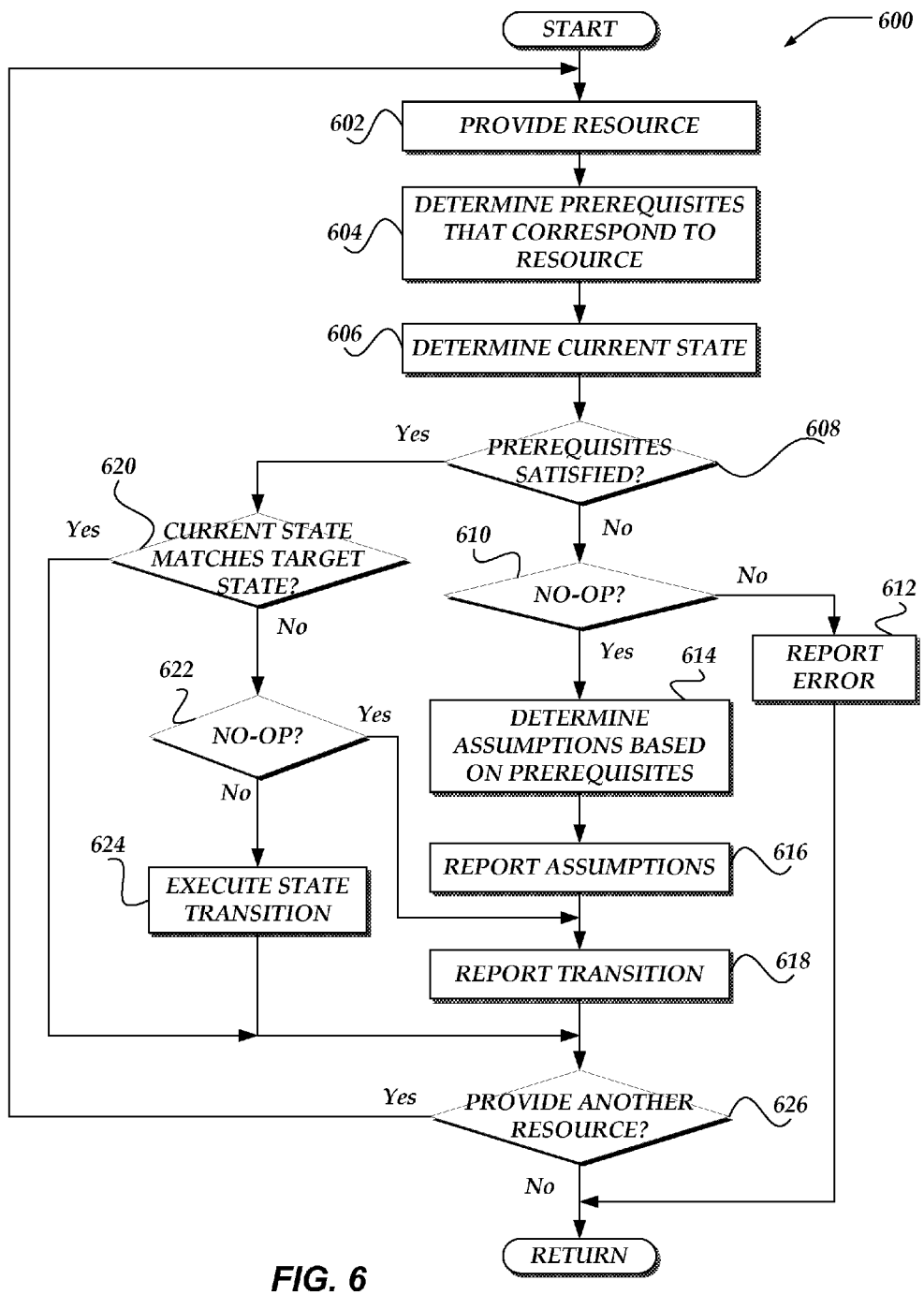
FIG. 6 illustrates a logical flow diagram generally showing an alternative embodiment of a process for determining if prerequisites for a resource are satisfied and reporting assumptions based on the prerequisites.

FIG. 6 illustrates a logical flow diagram generally showing an alternative embodiment of a process for determining if prerequisites for a resource are satisfied and reporting assumptions based on the prerequisites. Process 600 begins, after a start block, at block 602, where a resource may be provided. In at least one of various embodiments, block 602 may employ embodiments of block 502 of FIG. 5 to provide a resource.

Process 600 proceeds to block 604, where at least one prerequisite that corresponds to the provided resource may be determined. In at least one of various embodiments, block 604 may employ embodiments of block 604 of FIG. 6 to determine prerequisites that correspond to the provided resource.

Process 600 proceeds next to block 606, where a current state of the system may be determined. In at least one embodiment, a current state of the system may be stored by the system. In some embodiments, the current state may include information about the computing system, including, but not limited to, applications that are installed and/or running, accessible files and/or directories, or the like.

Process 600 continues at decision block 608, where a determination may be made whether the at least one prerequisite is satisfied for the resource. In at least one of various embodiments, decision block 608 may employ embodiments of block 506 of FIG. 5 to determine whether the prerequisites are met for the resource.

In some embodiments, this determination may be based on one or more assumptions determined for one or more previously provided resources. In at least one embodiment, a prerequisite for a resource may be satisfied based on an assumption determined (e.g., at block 614) for a previous resource. For example, assume two resources need to be converged: install program (Resource_1) and start program (Resource_2). Now assume the prerequisites for Resource_1 were previously unsatisfied (e.g., program did not install) and that the assumptions "target state is installed" and that the system "would execute an install action" were determined (e.g., at block 614). These assumptions may then be utilized to determine if the prerequisites for Resource_2 are satisfied. For example, the prerequisite for Resource_2 may include "program successfully installed." Since the program did not install, but assumptions of the previous resource where that the program was installed, the prerequisites for Resource_2 may be satisfied.

If the prerequisites are met, then process 600 may flow to decision block 620; otherwise, process 600 may flow to decision block 610.

At decision block 620, a determination may be made whether the current state of the system matches the target state defined by the resource (e.g., a target state). In some embodiments, the current state may be compared to the target state to determine if the states match. If the current state matches the target state, then process 600 may flow to decision block 626; otherwise, process 600 may flow to decision block 622.

At decision block 622, a determination may be made whether the system is operating in a non-operational, or "no-op," mode. In some embodiments, a no-op mode may indicate that actions to be performed by the configuration management may be simulated and/or emulated, but not executed by the system. For example, assume an "install application" action—the application may not be installed, but may be identified as being installed for other actions and/or operations of the system. If the system is operating in a no-op mode, then process 600 may flow to block 618; otherwise, process 600 may flow to block 624.

At block 624, a state transition may be executed, and/or otherwise may occur, to put the system into the target state. In some embodiments, transitions may be determined based on the current state, the target state defined by the resource, and the provider. In at least one embodiment, the state transition may be determined by a provider that enables the system to move from the current state to the target state defined by the resource. In some embodiments, different providers may be configured to enable the execution of different actions to perform the state transition. As described above, providers may be configured to perform separate actions for different computing systems and/or platforms. In at least one embodiment, each provider may enable different actions to perform a state transition to move the system from the current state to the target state. After the transition is determined, the system may execute the transition to put the system into the target state. After block 624, process 600 may flow to decision block 626.

If, at decision block 608, the prerequisites for the resource are not satisfied, then process 600 may flow to decision block 610. At decision block 610, a determination may be made whether the system is operating in a no-op mode. In at least one of various embodiments, decision block 610 may employ embodiments of decision block 622 determine if the system is operating in a no-op mode. If the system is operating in a no-op mode, then process 600 may flow to block 614; otherwise, process 600 may flow to block 612.

At block 612, an error may be reported. In some embodiments, if the system is not operating in a no-op mode, then the actions may be performed and/or executed by the system. However, if at decision block 608 the prerequisites are not satisfied, then the system may be unable to execute the actions. So, the system may report an error to a user and/or system administrator. After block 612, process 600 may return to a calling process to perform other actions.

If, at decision block 610, the system is operating in a no-op mode, then process 600 may flow to block 614. At block 614, at least one assumption may be determined based on the prerequisites that correspond to the resource. In at least one of various embodiments, block 614 may employ embodiments of block 508 of FIG. 5 to determine the assumptions.

Process 600 proceeds next to block 616, where the at least one determined assumption may be reported. In at least one embodiment, block 616 may employ embodiments of block 510 of FIG. 5 to report the assumptions to a user.

Process 600 continues at block 618, where a transition may be reported to the user. In some embodiments, block 618 may employ embodiments of block 624 to determine the transition to put the system into the target state. Unlike block 624, the system may report the transition, rather than execute the transition (because the system may be operating in a no-op mode).

In any event, process 600 proceeds next to decision block 626, where a determination of whether another resource may be provided. In some embodiments, a user may provide a plurality of resources, where the convergence of one or more resources depends on the convergence of one or more other resources. In some embodiments, this dependency may be a notification between resources. If another resource may be provided, then process 600 may loop to block 602 to provide the other resource; otherwise, process 600 may return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Use Case Example

FIGS. 7 and 8 show use case illustrations of multiple resources and the reported assumptions generated based on the resources.

Example 700 of FIG. 7 illustrates a plurality of resources and the assumptions reported based on prerequisites that correspond to the resources. Resources 704 and 708 may be provided by a user. In some embodiments, each of resources 704 and 708 may correspond to one or more prerequisites. By employing embodiments described herein, one or more assumptions may be determined and reported. For example, assumptions 702 and 706 may be determined based on resources 704 and 708, respectively. As illustrated, assumption 702 may indicate the current state (application apache2 not installed), the target state defined by the resource (application apache2 installed), and the state transition that would occur (the application would be installed). Similarly, assumption 706 may indicate the current state (service is down), the target state defined by the resource (application is running), and the state transition that would occur (the application would be started). Assumptions 706 may also include other assumptions. For example, a prerequisite of resource 708 may be that apache2 was installed. However, since it was not installed (as indicated by assumption 702), assumption 706 may indicate that it "expected init script in /etc/init.d/apache2 does not exist" and that it is "assuming init script would have been previously installed." These assumptions may enable a system administrator to better understand what errors occurred and what operation, action, or resource, caused the error. However, embodiments are not so limited to these resources, prerequisites, and/or assumptions, but rather others may be employed.

Example 800 of FIG. 8 is another use case example illustrating a resource and the assumptions reported based on prerequisites that correspond to the resource. In this example, assumptions 802 may be determined based on whether the prerequisites of resource 804 are satisfied. As illustrated, assumption 802 may indicate the current state (content-sha (ede78b)), the target state defined by the resource (which may be the content changes), and the state transition that would occur (content would be created). However, embodiments are not so limited to these resources, prerequisites, and/or assumptions, but rather others may be employed.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method for providing configuration management of computer resources for a computing system of at least one network device, wherein at least one other network device enables actions to be performed, comprising:

providing a computer resource that includes at least one attribute that defines a target state of the computing system;

employing at least one state machine to utilize the at least one attribute to generate at least one requirement function that determines at least one prerequisite that corresponds to the resource, wherein the state machine provides instructions for moving the resource from the current state to the target state, and wherein each different state machine is configured to perform separate actions for different computing systems to move the computing system from a current state into the target state based on at least the at least one attribute for the computer resource;

employing the at least one state machine to instantiate a lower-level state machine and to pass the at least one requirement function to the lower-level state machine;

determining at least one assumption that corresponds to the at least one requirement function regarding the computing system based on whether the at least one prerequisite is unsatisfied for the computer resource or the computing system is in a non-operational mode, wherein the at least one assumption includes at least a state transition that upon occurrence puts the computing system into the target state;

when another computer resource is converged with the resource, determining at least one other assumption based on whether at least one other perquisite is unsatisfied for the other computer resource, wherein the at least one other assumption includes one or more other state transitions that upon occurrence puts the computing system in the target state; and providing one or more of the at least one assumption or the at least one other assumption in a report to a user of the computing system.

2. The method of claim 1, further comprising:
when the system is in the non-operational mode, enabling the computing system to perform other actions as if the prerequisites are satisfied and the state transition occurred.

3. The method of claim 1, further comprising:
determining at least one other prerequisite that corresponds to another computer resource;
determining at least one other assumption based on whether the at least one other prerequisite is unsatisfied for the other computer resource; and
providing the at least one other assumption in the report.

4. The method of claim 1, wherein the state transition that upon occurrence puts the computing system into the target state is determined based on the current state of the computing system and the target state.

5. The method of claim 1, wherein the at least one assumption includes at least one action to be executed by the computing system if the at least one prerequisite is satisfied.

6. The method of claim 1, wherein satisfaction of the at least one prerequisite is based on at least one previously determined assumption for another computer resource.

7. The method of claim 1, wherein the at least one prerequisite is unsatisfied when at least one of a plurality of prerequisites are unsatisfied.

8. The method of claim 1, wherein the report of the at least one assumption includes at least the state transition, the current state of the computing system, and the target state of the computing system.

9. A system for providing configuration management of computer resources for a computing system of at least one network device, comprising:

at least one other network device, comprising:
- a memory for storing data and instructions; and
- a processor that executes the instructions to enable actions, comprising:
  - providing a computer resource that includes at least one attribute that defines a target state of the computing system;
  - employing at least one state machine to utilize the at least one attribute to generate at least one requirement function that determines at least one prerequisite that corresponds to the computer resource, wherein the state machine provides instructions for moving the computer resource from the current state to the target state, and wherein each different state machine is configured to perform separate actions for different computing systems to move the computing system from a current state into the target state based on at least the at least one attribute for the computer resource;
  - employing the at least one state machine to instantiate a lower-level state machine and to pass the at least one requirement function to the lower-level state machine;
  - determining at least one assumption that corresponds to the at least one requirement function regarding the computing system based on whether the at least one prerequisite is unsatisfied for the computer resource or the computing system is in a non-operational mode, wherein the at least one assumption includes at least a state transition that upon occurrence puts the computing system into the target state;
  - when another computer resource is converged with the computer resource, determining at least one other assumption based on whether at least one other perquisite is unsatisfied for the other computer resource, wherein the at least one other assumption includes one or more other state transitions that upon occurrence puts the computing system in the target state; and
  - providing one or more of the at least one assumption or the at least one other assumption in a report to a user of the system.

10. The system of claim 9, wherein the processor executes the instructions to enable further actions, comprising:
when the computing system is in a non-operational mode, enabling the computing system to perform other actions as if the prerequisites are satisfied and the state transition occurred.

11. The system of claim 9, wherein the processor executes the instructions to enable further actions, comprising:
determining at least one other prerequisite that corresponds to another computer resource;
determining at least one other assumption based on whether the at least one other prerequisite is unsatisfied for the other computer resource; and
providing the at least one other assumption in the report.

12. The system of claim 9, wherein the state transition that upon occurrence puts the computing system into the target state is determined based on the current state of the computing system and the target state.

13. The system of claim 9, wherein the at least one assumption includes at least one action to be executed by the computing system when the at least one prerequisite is satisfied.

14. The system of claim 9, wherein satisfaction of the at least one prerequisite is based on at least one previously determined assumption for another computer resource.

15. The system of claim 9, wherein the at least one prerequisite is unsatisfied when at least one of a plurality of prerequisites are unsatisfied.

16. The system of claim 9, wherein the report of the at least one assumption includes at least the state transition, the current state of the computing system, and the target state of the computing system.

17. A processor readable non-transitory storage media that includes instructions for providing configuration management of computer resources for a computing system of at least one network device, wherein the execution of the instructions by a processor enables actions, comprising:
- providing a computer resource that includes at least one attribute that defines a target state of the computing system;
- employing at least one state machine to utilize the at least one attribute to generate at least one requirement function that determines at least one prerequisite that corresponds to the computer resource, wherein the state machine provides instructions for moving the computer resource from the current state to the target state, and wherein each different state machine is configured to perform separate actions for different computing systems to move the computing system from a current state into the target state based on at least the at least one attribute for the computer resource;
- employing the at least one state machine to instantiate a lower-level state machine and to pass the at least one requirement function to the lower-level state machine;
- determining at least one assumption that corresponds to the at least one requirement function regarding the computing system based on whether the at least one prerequisite is unsatisfied for the computer resource or the computing system is in a non-operational mode, wherein the at least one assumption includes at least a state transition that upon occurrence puts the computing system into the target state;
- when another computer resource is converged with the computer resource, determining at least one other assumption based on whether at least one other perquisite is unsatisfied for the other computer resource, wherein the at least one other assumption includes one or more other state transitions that upon occurrence puts the computing system in the target state; and
- providing one or more of the at least one assumption or the at least one other assumption in a report to a user of the computing system.

18. The media of claim 17, further comprising:
when the system is in a non-operational mode, enabling the computing system to perform other actions as if the prerequisites are satisfied and the state transition occurred.

19. The media of claim 17, further comprising:
determining at least one other prerequisite that corresponds to another computer resource;
determining at least one other assumption based on whether the at least one other prerequisite is unsatisfied for the other computer resource; and
providing the at least one other assumption in the report.

20. The media of claim 17, wherein the state transition that upon occurrence puts the computing system into the target state is determined based on the current state of the computing system and the target state.

21. The media of claim 17, wherein the at least one assumption includes at least one action to be executed by the computing system when the at least one prerequisite is satisfied.

22. The media of claim 17, wherein satisfaction of the at least one prerequisite is based on at least one previously determined assumption for another computer resource.

23. The media of claim 17, wherein the at least one prerequisite is unsatisfied when at least one of a plurality of prerequisites are unsatisfied.

24. A network device for providing configuration management of resources for a computing system of at least one network device, comprising:
  a memory for storing data and instructions; and
  a processor that executes the instructions to enable actions, comprising:
    providing a computer resource that includes at least one attribute that defines a target state of the computing system;
    employing at least one state machine to utilize the at least one attribute to generate at least one requirement function that determines at least one prerequisite that corresponds to the computer resource, wherein the state machine provides instructions for moving the computer resource from the current state to the target state, and wherein each different state machine is configured to perform separate actions for different computing systems to move the computing system from a current state into the target state based on at least the at least one attribute for the computer resource;
    employing the at least one state machine to instantiate a lower-level state machine and to pass the at least one requirement function to the lower-level state machine;
    determining at least one assumption that corresponds to the at least one requirement function regarding the computing system based on whether the at least one prerequisite is unsatisfied for the computer resource or the computing system is in a non-operational mode, wherein the at least one assumption includes at least a state transition that upon occurrence puts the computing system into the target state;
    when another computer resource is converged with the computer resource, determining at least one other assumption based on whether at least one other perquisite is unsatisfied for the other computer resource, wherein the at least one other assumption includes one or more other state transitions that upon occurrence puts the computing system in the target state; and
    providing one or more of the at least one assumption or the at least one other assumption in a report to a user of the computing system.

25. The network device of claim 24, wherein the processor executes the instructions to enable further actions, comprising:
  when the computing system is in a non-operational mode, enabling the computing system to perform other actions as if the prerequisites are satisfied and the state transition occurred.

26. The network device of claim 24, wherein the processor executes the instructions to enable further actions, comprising:
  determining at least one other prerequisite that corresponds to another computer resource;
  determining at least one other assumption based on whether the at least one other prerequisite is unsatisfied for the other computer resource; and
  providing the at least one other assumption in the report.

27. The network device of claim 24, wherein the at least one assumption includes at least one action to be executed by the computing system when the at least one prerequisite is satisfied.

28. The network device of claim 24, wherein satisfaction of the at least one prerequisite is based on at least one previously determined assumption for another computer resource.

29. The network device of claim 24, wherein the at least one prerequisite is unsatisfied when at least one of a plurality of prerequisites are unsatisfied.

30. The method of claim 1, wherein the state machine includes at least a class of objects.

* * * * *